UNITED STATES PATENT OFFICE.

HENRY W. WORTCHE, OF BALTIMORE, MARYLAND.

COMPOSITION OF MATTER.

No. 887,173.

Specification of Letters Patent.

Patented May 12, 1908.

Application filed January 3, 1908. Serial No. 409,236.

*To all whom it may concern:*

Be it known that I, HENRY W. WORTCHE, a citizen of the United States, residing at Baltimore city, and State of Maryland, have invented certain new and useful Improvements in Composition of Matter, of which the following is a specification.

My invention relates to a composition of matter which is capable of extensive use for a great variety of purposes in many different arts. The primary object being however, to provide valve disks, seats or packings in their nature somewhat elastic, and which will be indestructible upon contact of steam of any kind, oils, hot and cold water and the like, and other fluids of a destructive nature.

I prefer to use the following formula: ninety per cent. lead, ten per cent. antimony. The lead used in my composition is of the ordinary kind, having a specific gravity of about 11.36 and an atomic weight of about 205.35; the antimony may be either amorphous or crystalline, and ordinarily has a specific gravity of 6.7 and an atomic weight of about 120. At this gravity and weight the antimony is easily fused with the lead.

For the purpose of obtaining a hard composition, for indestructible packing, and the like, to withstand the contact of steam, oils, acids, alkalies, and which will effectively resist the passage of fluids under high pressure, and will successfully withstand for a long period of time the action of such fluids, even though the temperature thereof may be high, that will be impervious to the attacks of the acids and alkalies, I have found it more advantageous to use eighty per cent. lead and twenty per cent. antimony. A composition possessing such high resistance qualities, is admirably adapted for a great variety of purposes and particularly for that of valve construction, conveying superheated steam under high pressure and temperatures that are employed in modern industries.

The high pressure and accompanying high temperatures under which steam is employed for modern industrial purposes have rendered comparatively useless elastic valve compositions, such as vulcanized rubber compositions, such compositions burning away or otherwise deteriorating after having been in use but a short time. This has resulted in the renouncing by the trade of elastic compositions of the class referred to for valve construction, particularly valve disks, and the substitution therefor of metal, such as copper and bronze, which however, are unable to prevent the leakage of fluids under high pressures or temperatures, or both.

Having fully described my invention, what I claim as new, and desire to secure by Letters Patent, is:

1. A valve seat composed of an alloy containing lead and antimony, substantially as described.

2. A valve seat composed of an alloy containing ninety per cent. lead and ten per cent. antimony, substantially as described.

In testimony whereof I affix my signature in presence of two witnesses.

HENRY W. WORTCHE.

Witnesses:
 E. WALTON BREWINGTON,
 MARY M. MAGRAW.